June 9, 1931. J. H. DICKINSON 1,808,808
MUSIC ROLL MAGAZINE
Filed Oct. 15, 1928 13 Sheets-Sheet 1

INVENTOR
Joseph Hunter Dickinson
BY
ATTORNEY

June 9, 1931.  J. H. DICKINSON  1,808,808
MUSIC ROLL MAGAZINE
Filed Oct. 15, 1928   13 Sheets-Sheet 4

INVENTOR
Joseph Hunter Dickinson
BY
ATTORNEY

June 9, 1931.  J. H. DICKINSON  1,808,808
MUSIC ROLL MAGAZINE
Filed Oct. 15, 1928  13 Sheets-Sheet 5
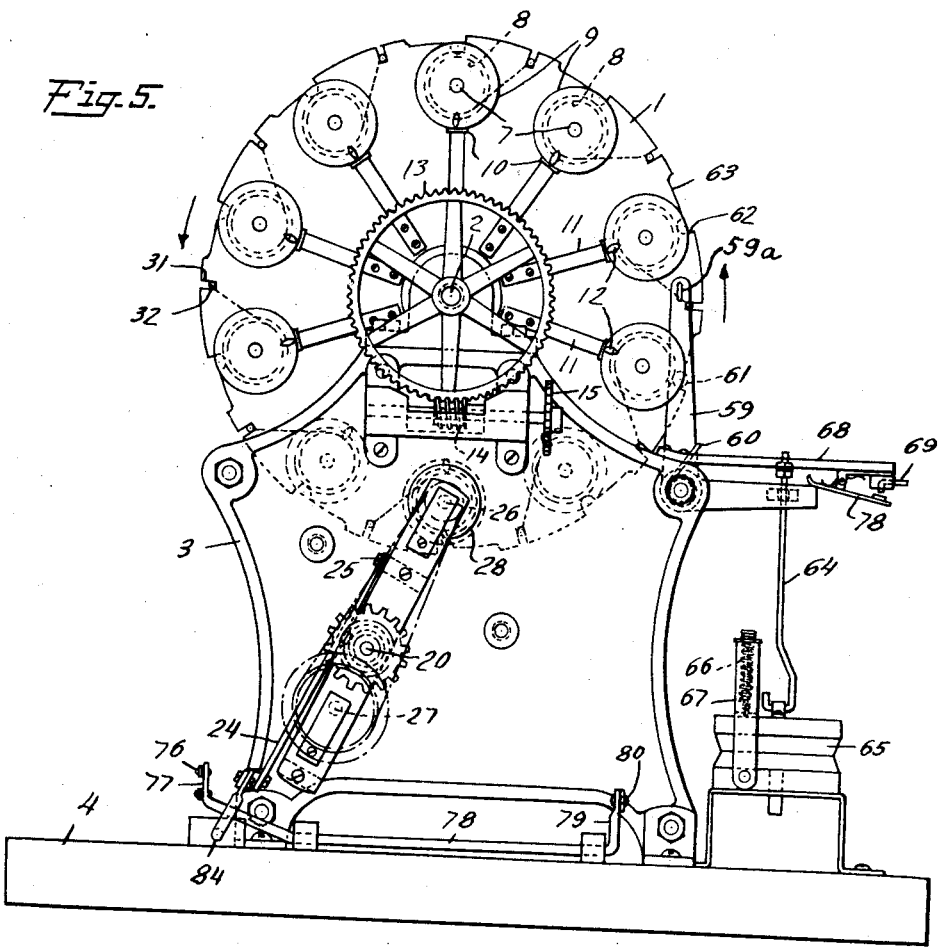
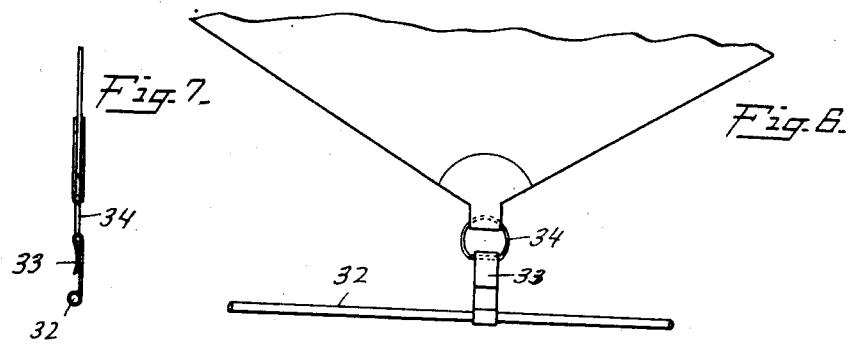
INVENTOR
Joseph Hunter Dickinson
BY
F. W. Schurr Jr.
ATTORNEY

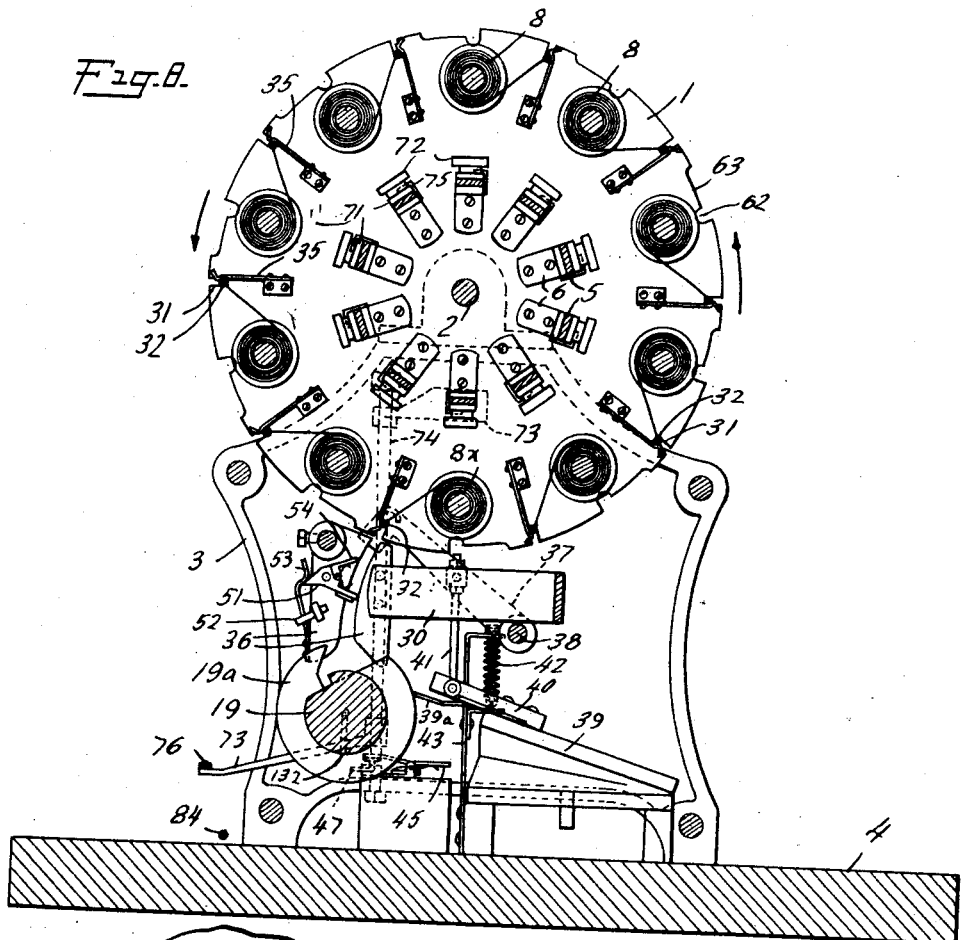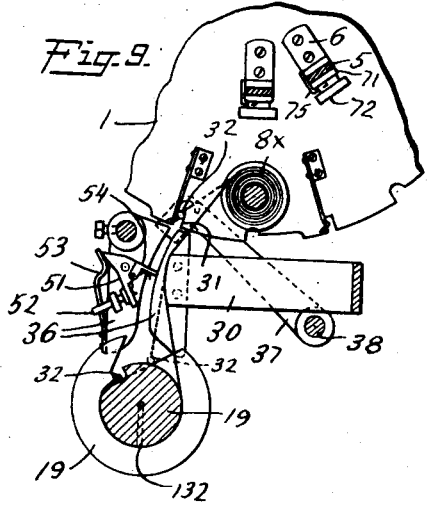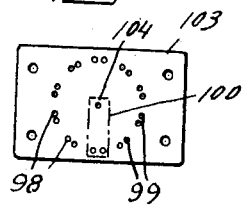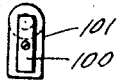

June 9, 1931. J. H. DICKINSON 1,808,808
MUSIC ROLL MAGAZINE
Filed Oct. 15, 1928 13 Sheets-Sheet 7
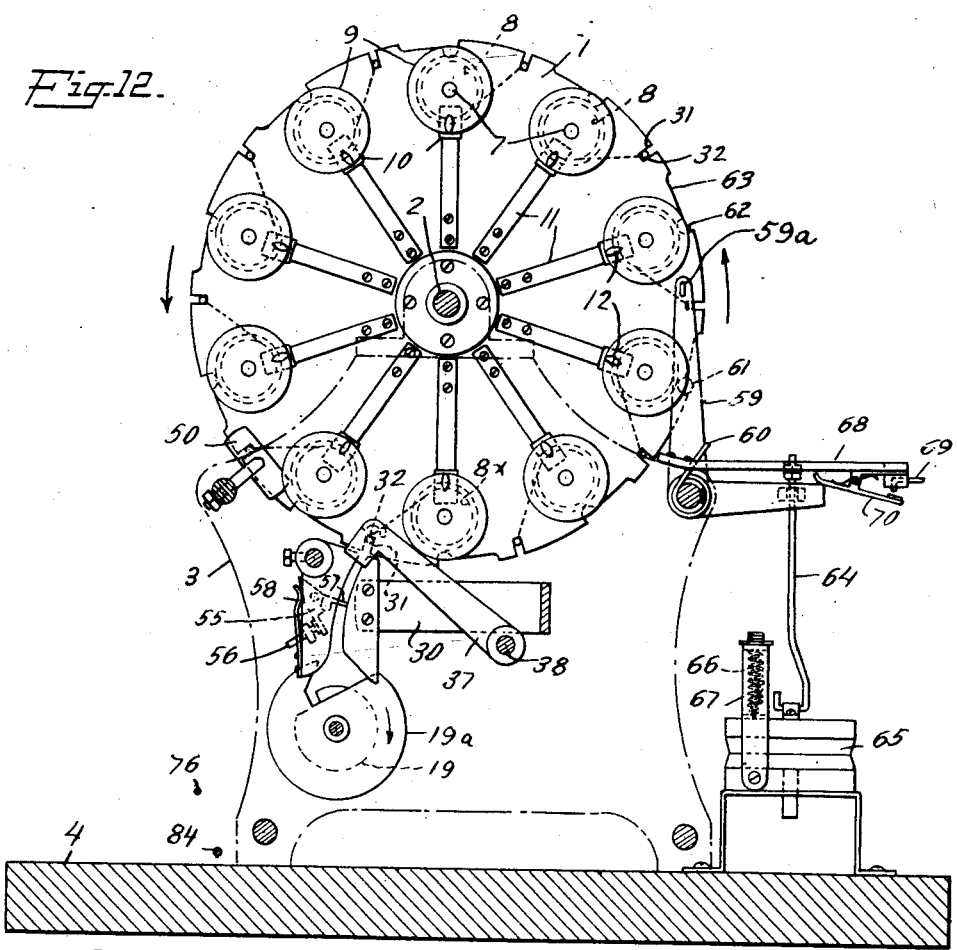
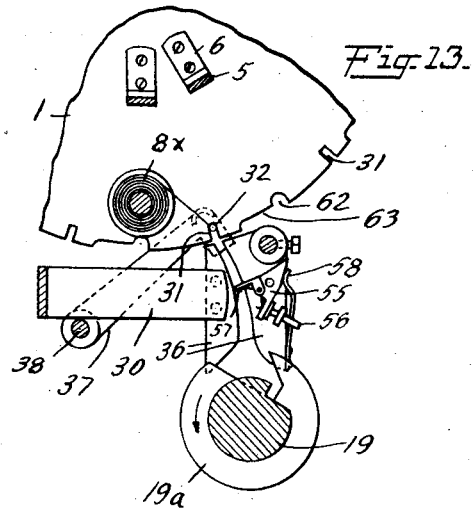
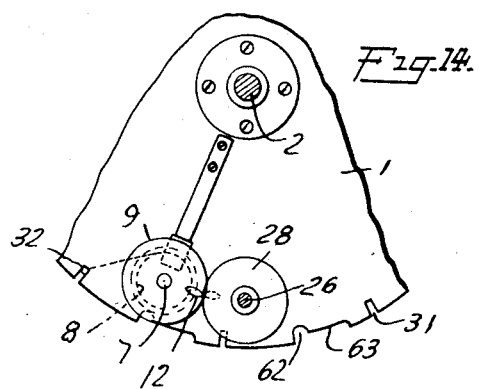
INVENTOR
Joseph Hunter Dickinson
BY
ATTORNEY

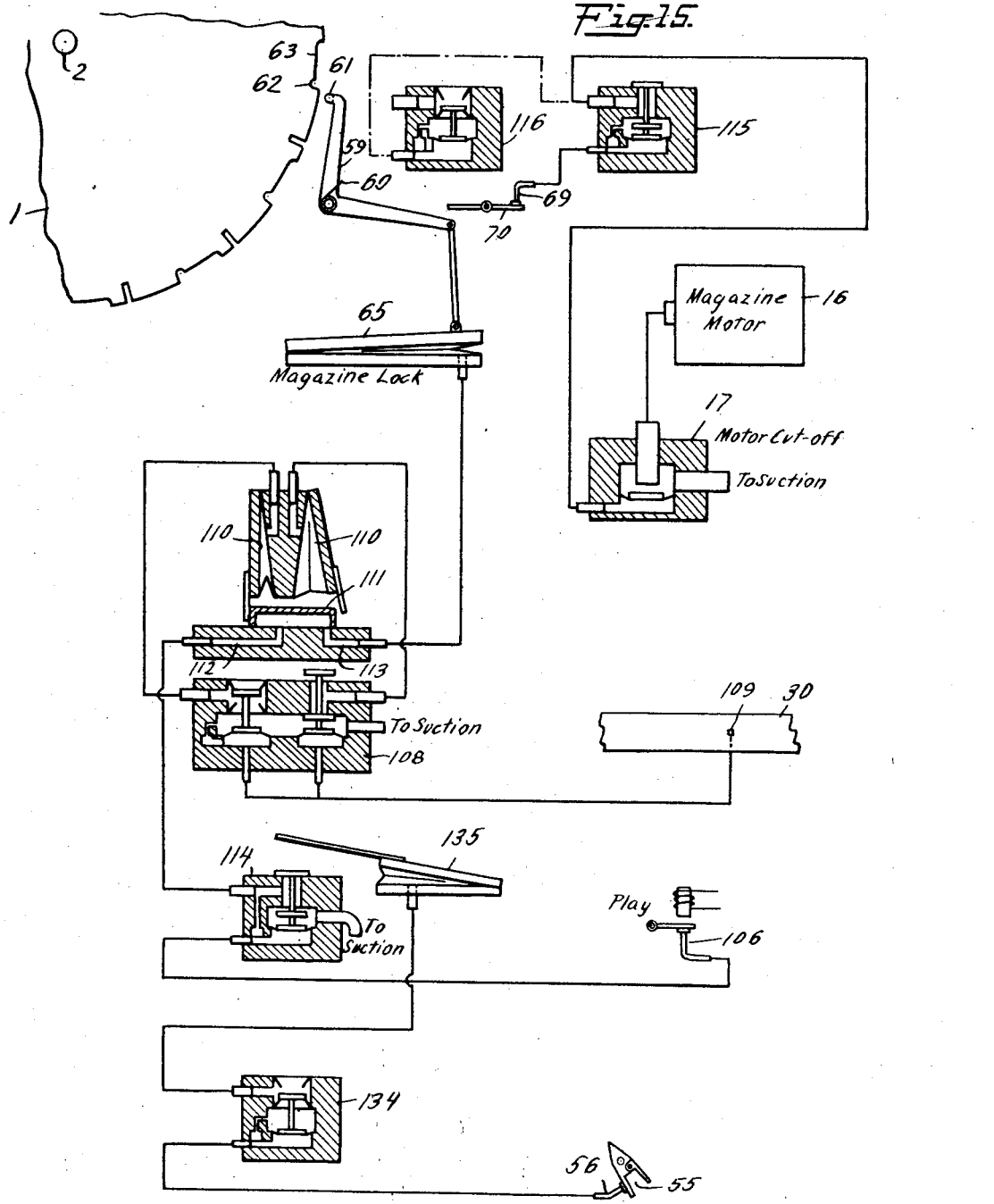

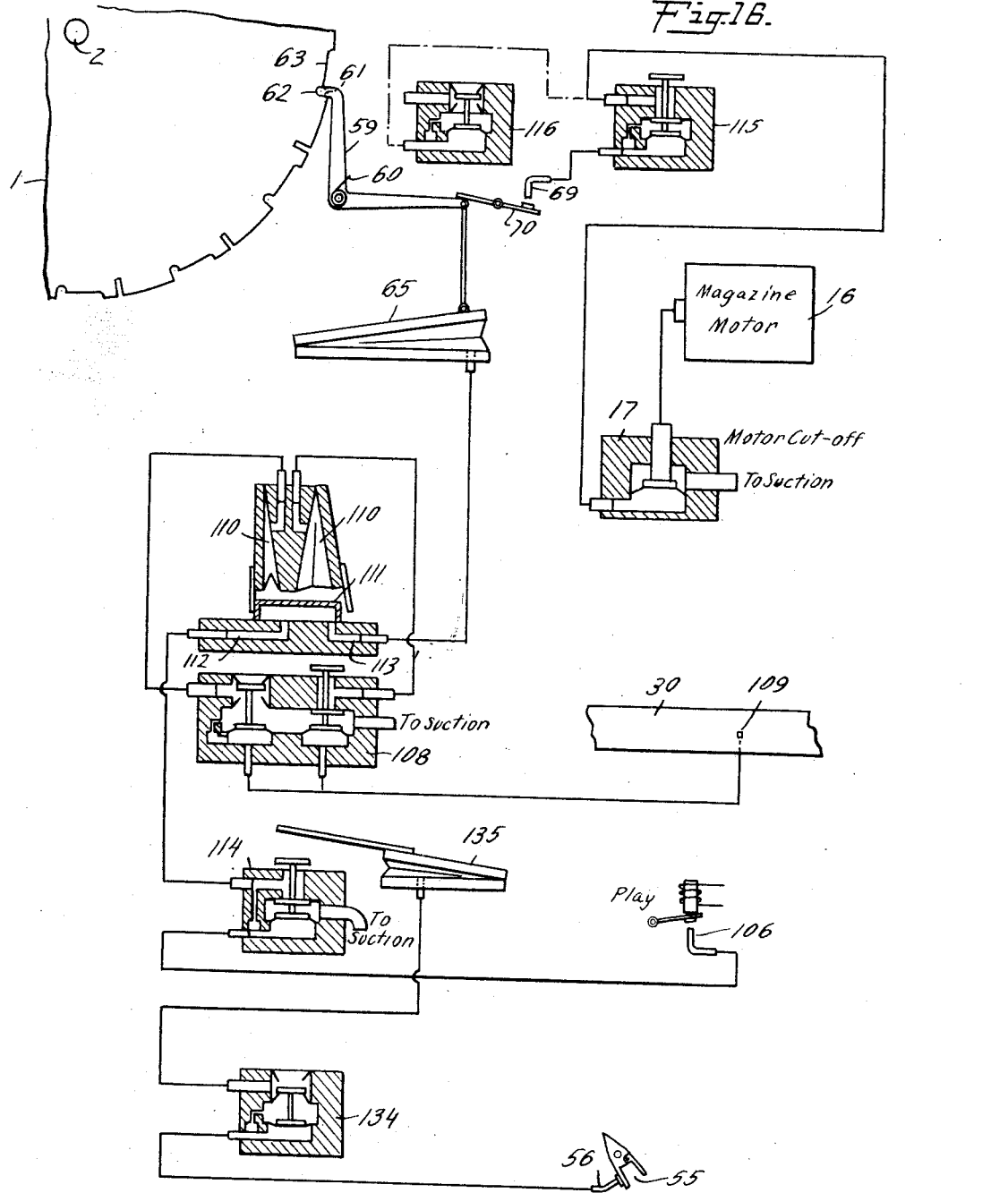

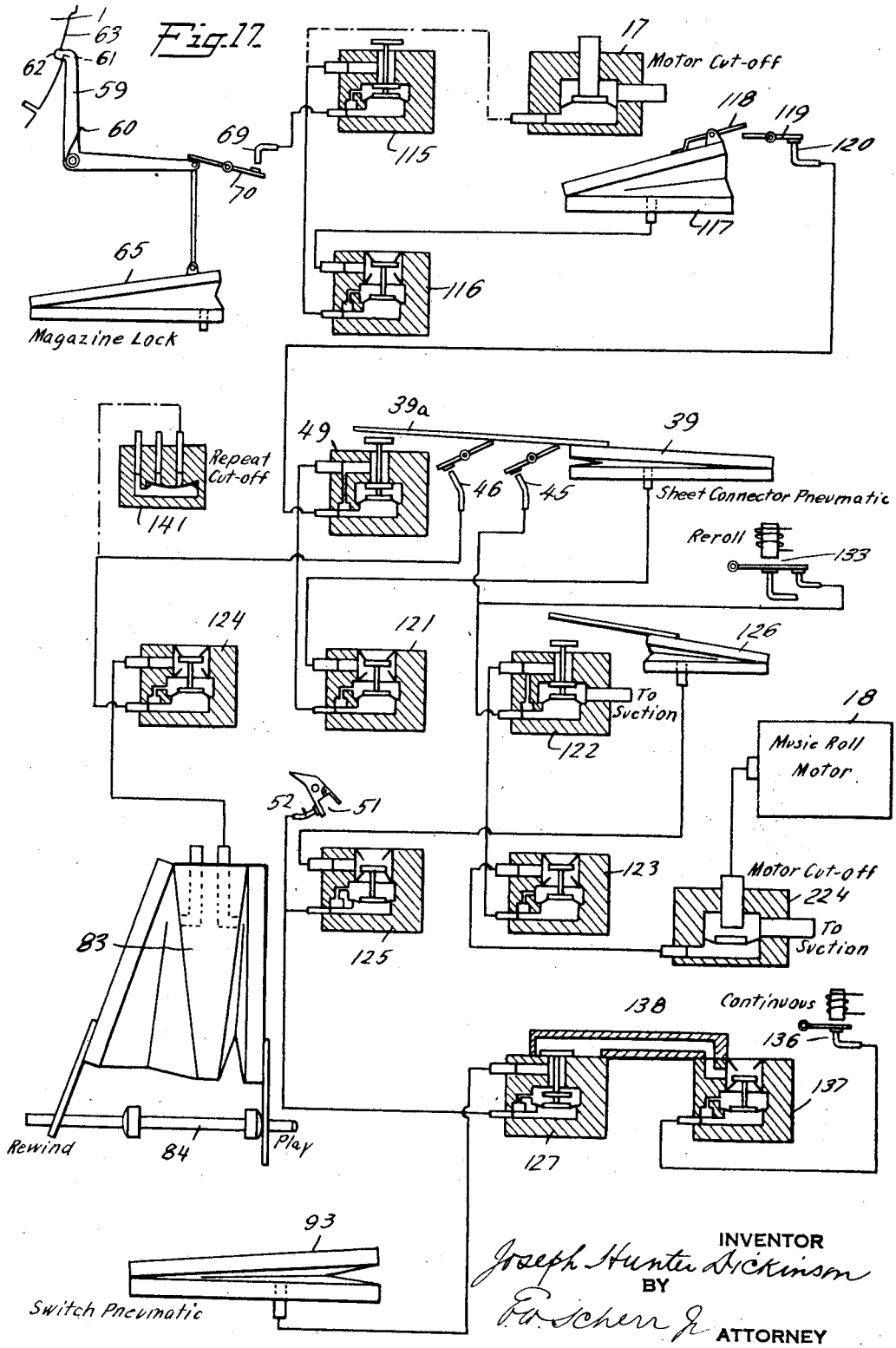

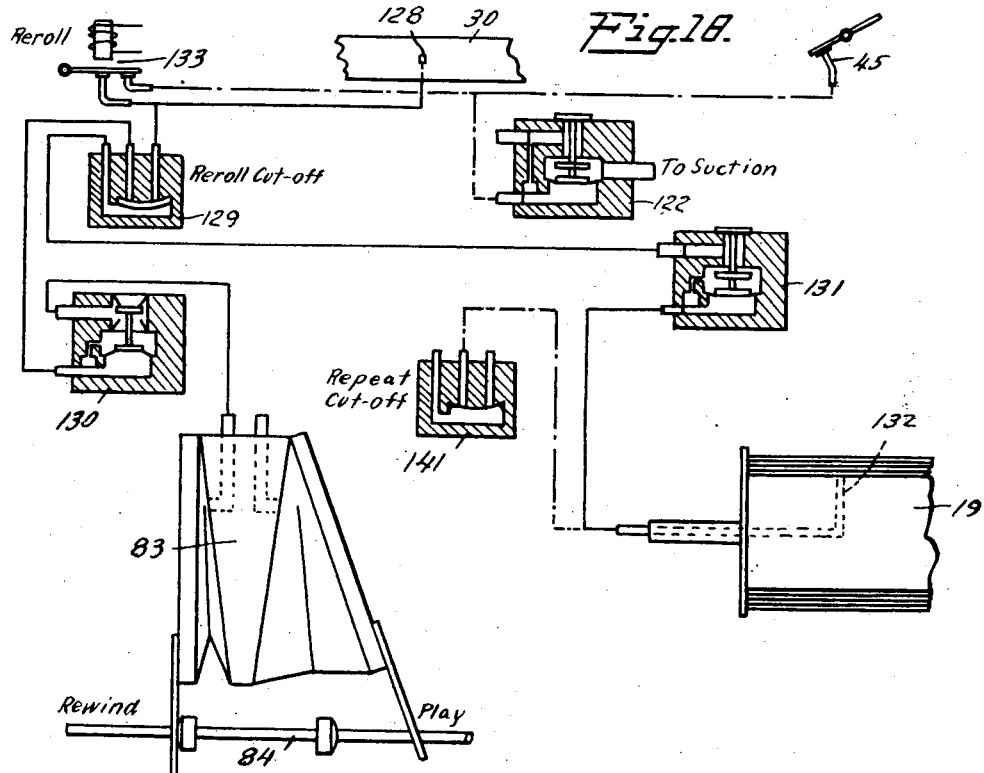
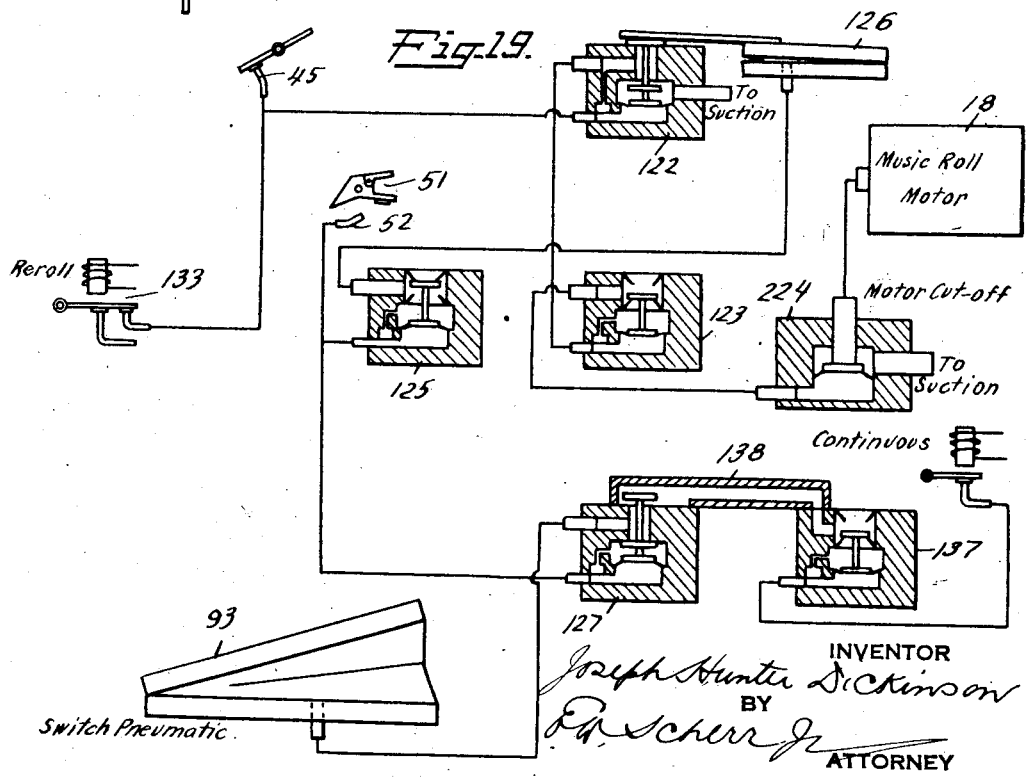

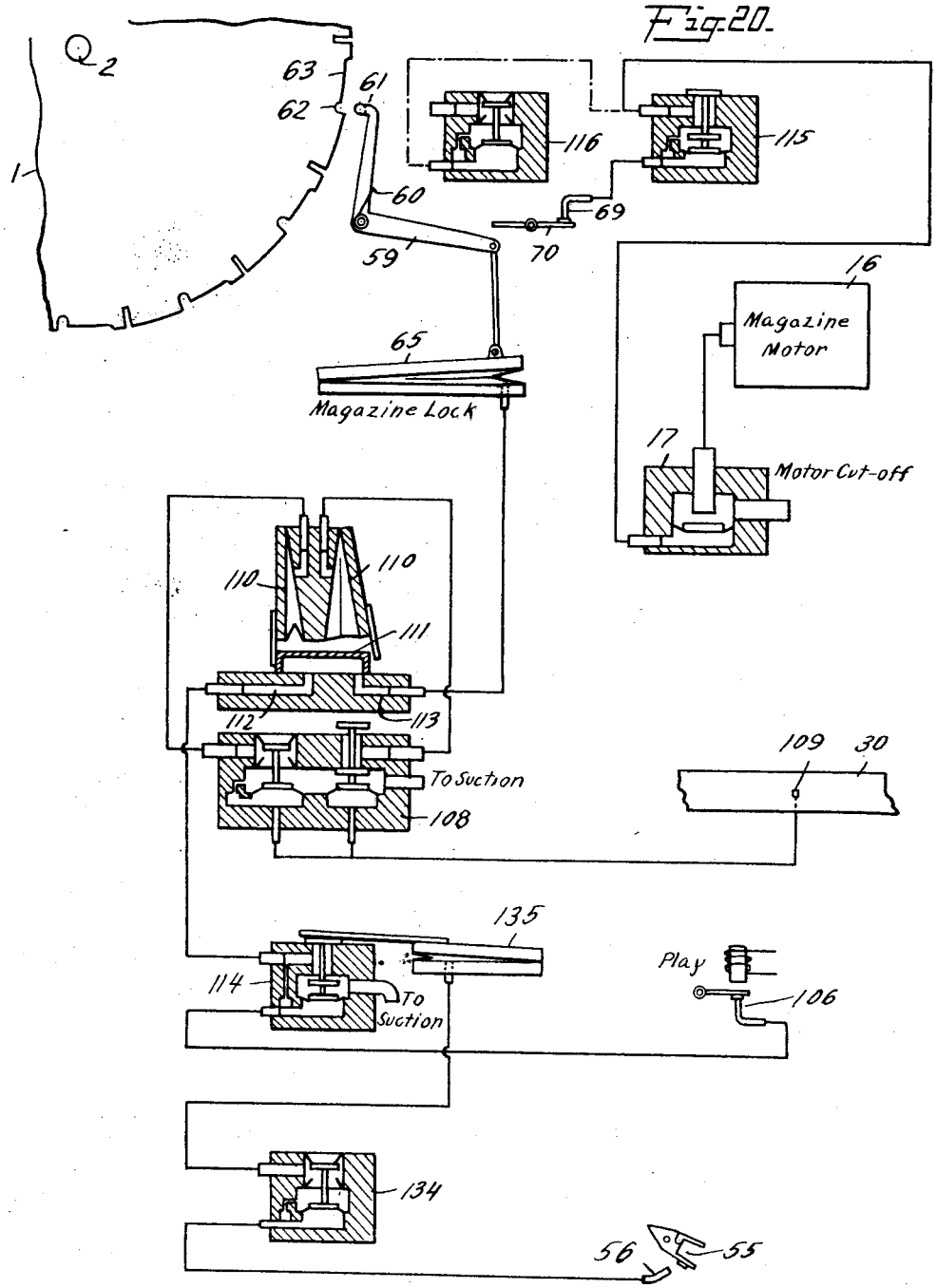

June 9, 1931.  J. H. DICKINSON  1,808,808
MUSIC ROLL MAGAZINE
Filed Oct. 15, 1928    13 Sheets-Sheet 13
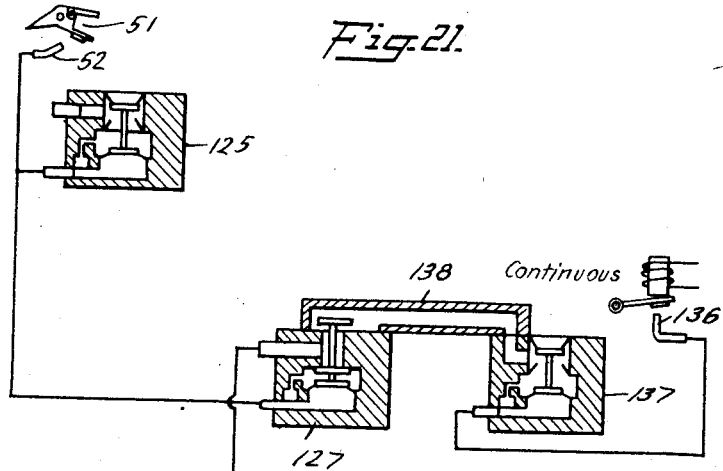
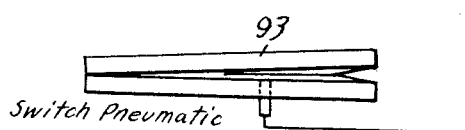
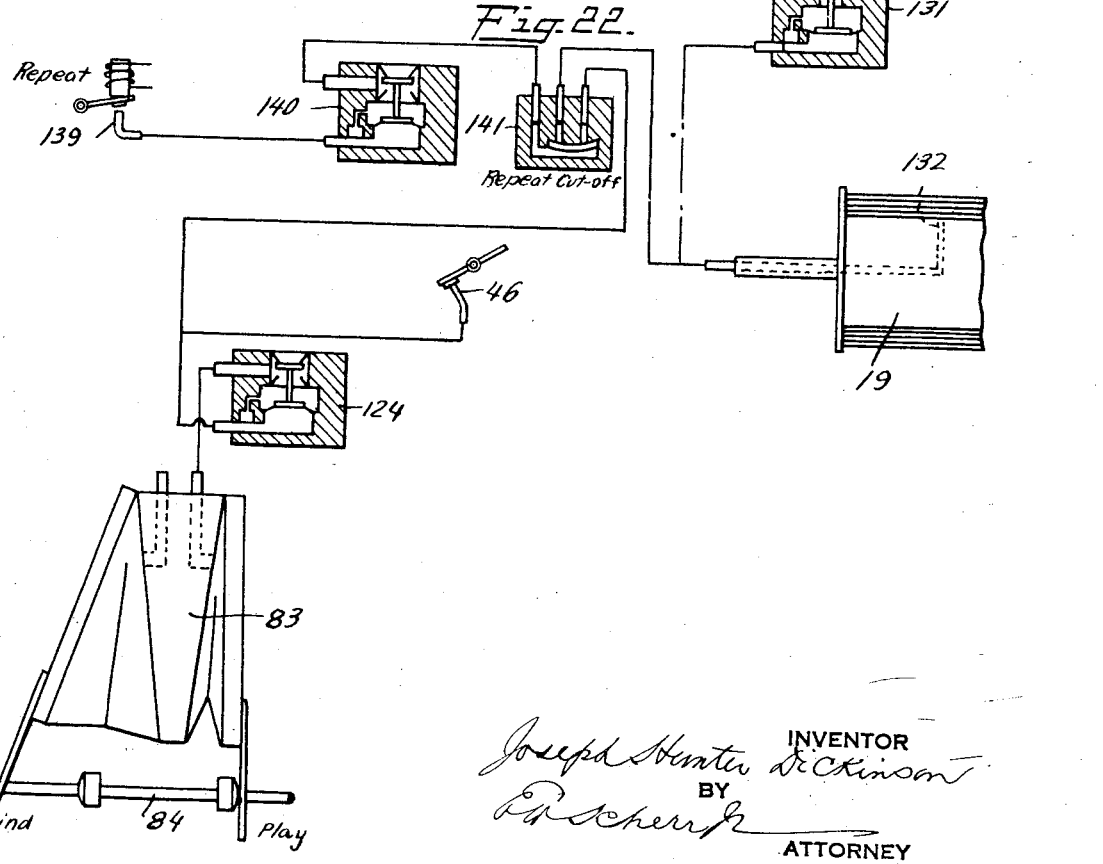

Patented June 9, 1931

1,808,808

UNITED STATES PATENT OFFICE

JOSEPH HUNTER DICKINSON, OF LARCHMONT, NEW YORK, ASSIGNOR TO THE AEOLIAN COMPANY, A CORPORATION OF CONNECTICUT

MUSIC ROLL MAGAZINE

Application filed October 15, 1928. Serial No. 312,599.

My present invention relates to a music-roll magazine and machine for use with automatic pianos and organs adapted to be loaded with a plurality of music-rolls and having means for operating it from either a near or a distant station or stations to play any selected roll or rolls in the magazine to the exclusion of others, or to play all of the rolls in the magazine seriatim including the automatic repeating of any roll or rolls, and other possibilities of use inherent in the hereinafter described machine and invention.

Figure 1:
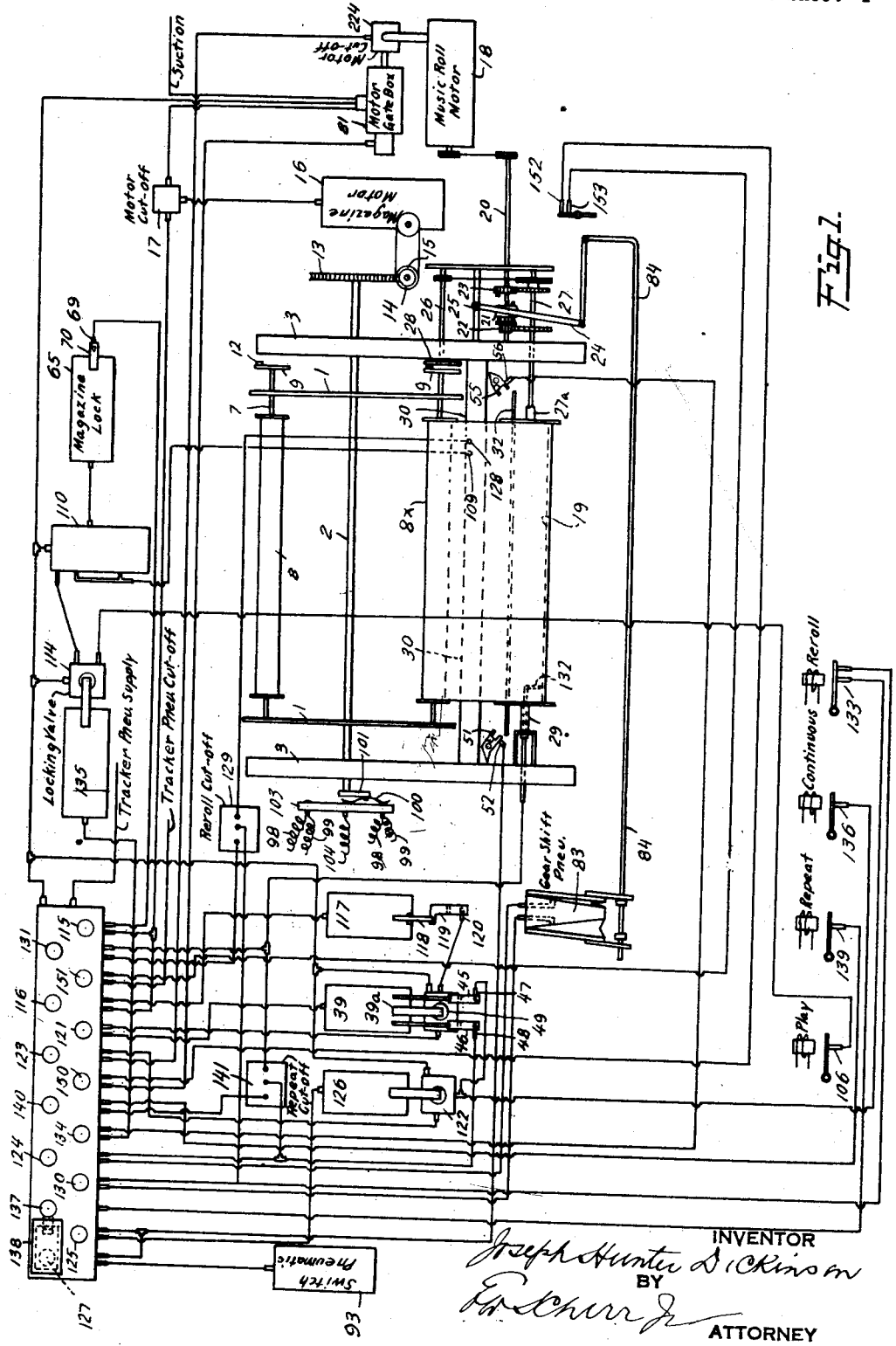
Figure 2:
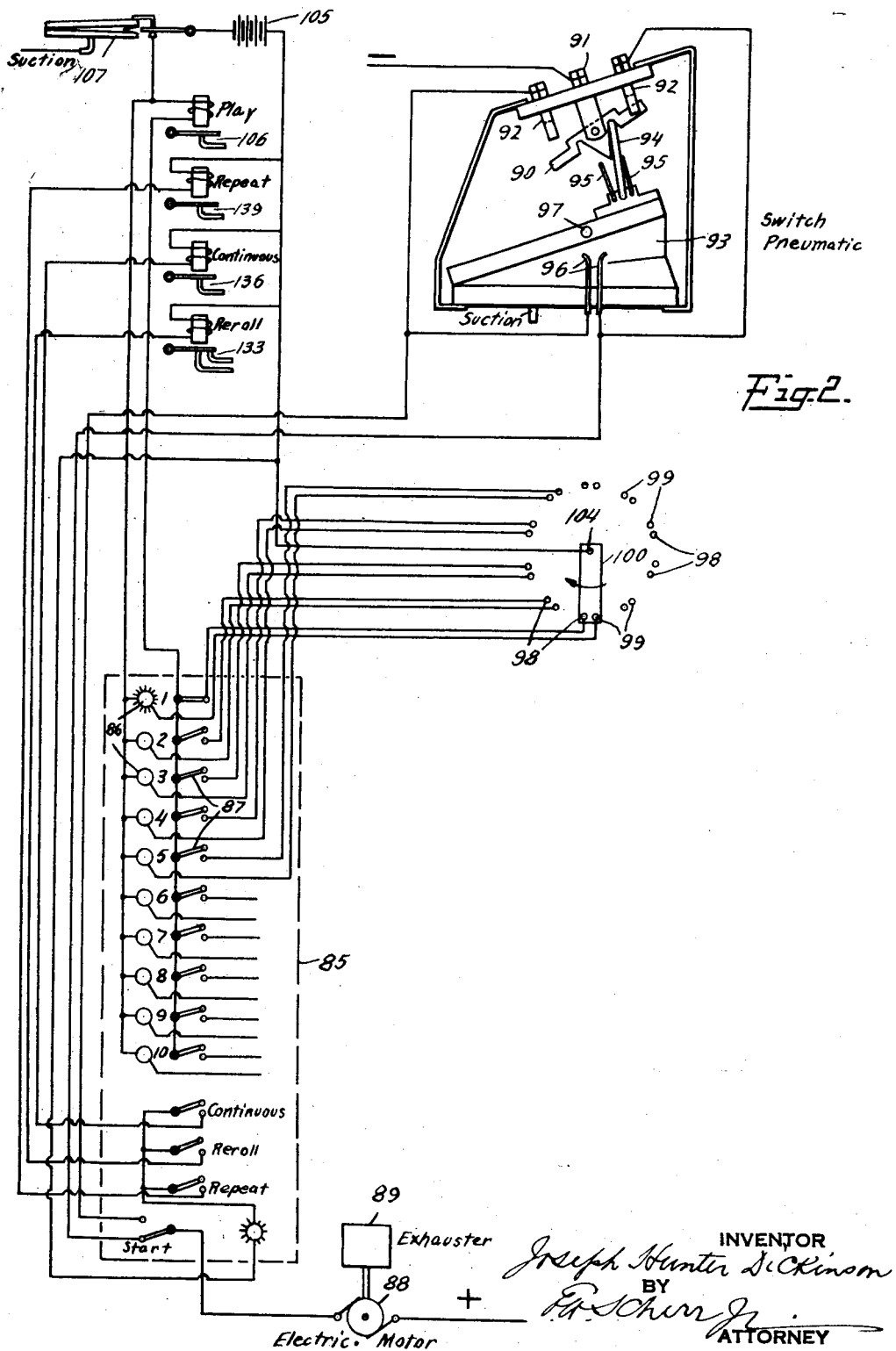
Figure 3:
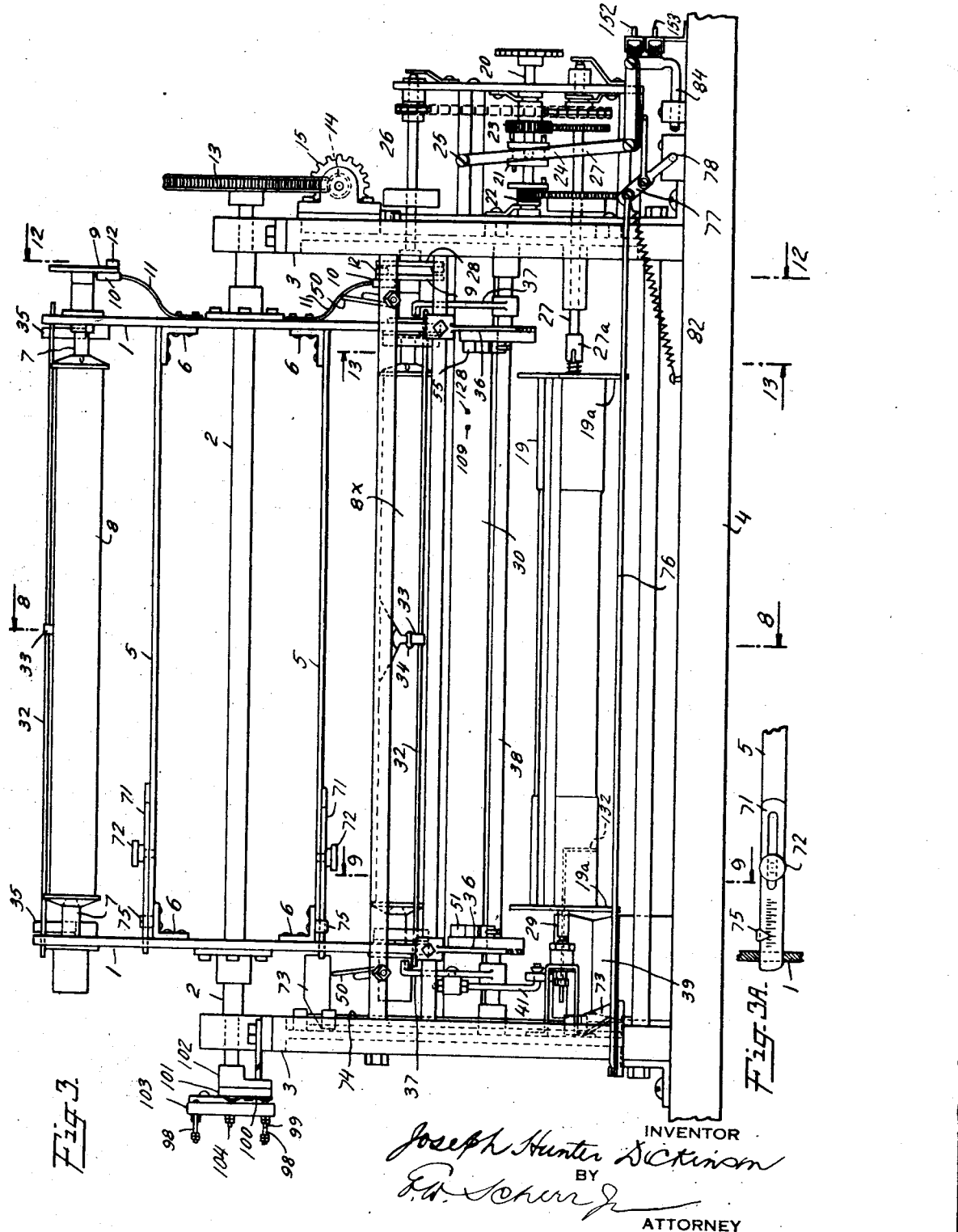
Figure 4:
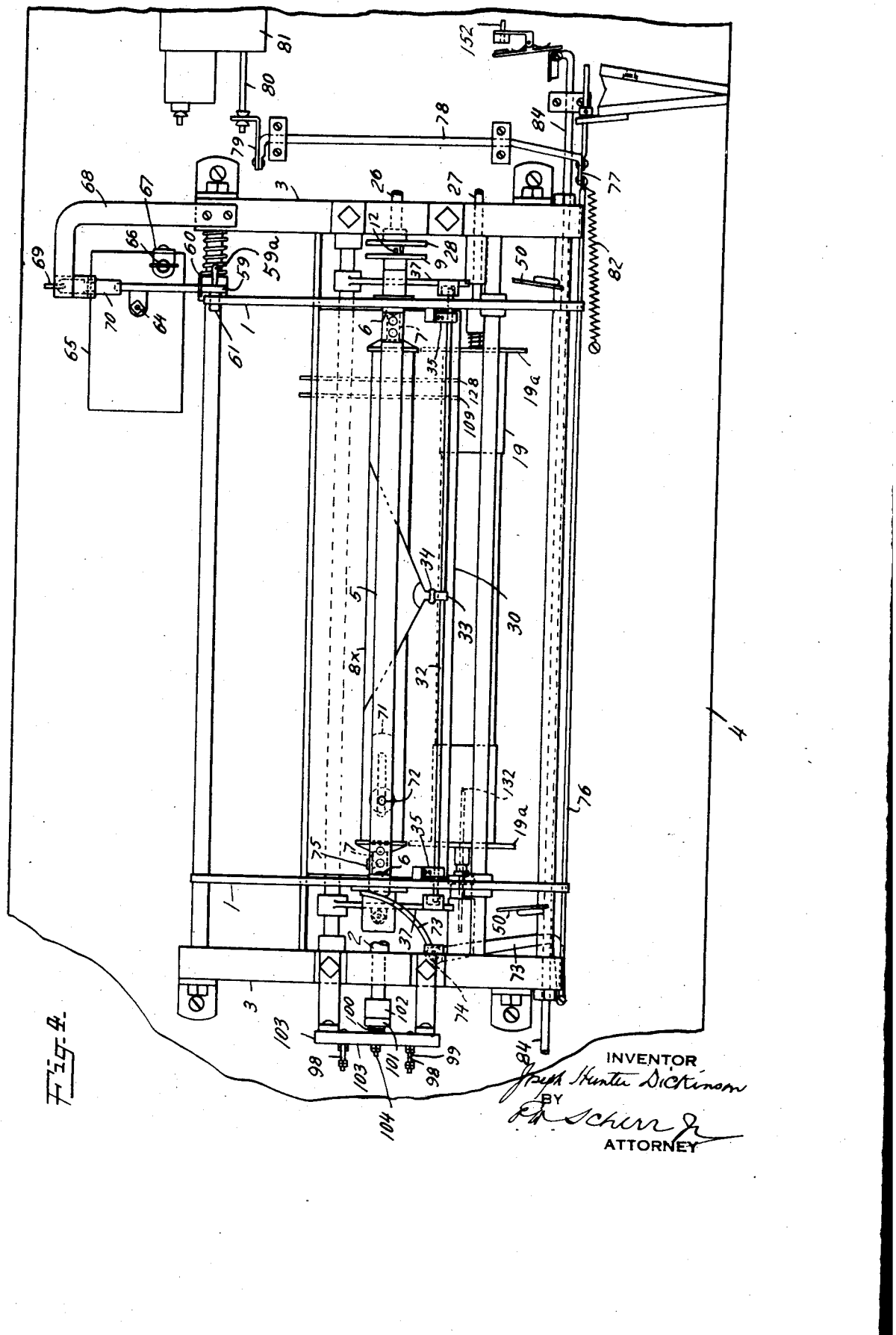

The drawings show a machine which is an embodiment of my invention in its preferred form. Fig. 1 is a schematic view of the principal parts and the connections between them; Fig. 2 is a schematic view of a tablet and its parts for operating the machine from either a near or distant station, and of the immediate parts of the machine to which the tablet parts are connected; Fig. 3 is a front elevation of the magazine of the machine; Fig. 3ª is a fragmentary view of a detail; Fig. 4 is a plan view of the magazine of Fig. 3, omitting some of the upper portion thereof; Fig. 5 is an end view of the magazine as seen from the right in Fig. 3; Figs. 6 and 7 are respectively plan and edge views of the front end of the music-sheet and the rod to which it is attachable for operation in the magazine; Fig. 8 is a sectional view on the line 8—8 in Fig. 3 looking in the direction of the arrows; Fig. 9 is a fragmentary detail of Fig. 8 showing the parts in a different adjustment; Figs. 10 and 11 are face views respectively of the so-called distributor contact plate and wiper; Fig. 12 is a sectional view on the line 12—12 in Fig. 3 looking in the direction of the arrows; Fig. 13 is a view of a fragment of Fig. 12 looked at from the other side; Fig. 14 is a view of a fragment of the magazine including the music-roll clutch disc and the clutch disc of one of the music-roll driving spindles of the magazine to show how said discs come into clutching engagement by the rotation of the magazine; and Figs. 15 to 22 inclusive are diagrammatic views showing selected parts from the foregoing figures, together with additional parts shown only schematically in Figs. 1 and 2, the purpose of said Figs. 15 to 22 being to facilitate the understanding of the sequence of operations and the additional possibilities and utility of the machine and invention.

I will now describe my invention and will refer to the devices shown in the drawings in so doing, said drawings showing one preferred embodiment thereof. In the drawings the same numerals refer to the same parts throughout.

The rotary magazine consists of two end discs 1 rigidly secured to a shaft 2 whose ends are trunnions journalled in suitable bearings in stationary end-frames 3 mounted on the baseboard 4 of the machine. The aforesaid discs 1 are united by the cross-bars 5 and brackets 6. Spindles 7 of the usual type for operatively and releasable supporting music-rolls 8 between them are mounted on the aforesaid discs on their inner faces near their periphery. The particular magazine shown holds ten music-rolls. As usual, the spindles 7 on the left in Fig. 1 are idlers and those on the right are the driving spindles. The latter extend through to the outside of the right hand magazine disc where they carry clutch discs 9 against which shoes 10 supported by springs 11 yieldingly bear. The projection 12 on the outer face of these discs is for engagement with the music-roll driving means as will appear later.

The means for rotating the magazine comprises a worm wheel 13 on its shaft, a worm 14 in mesh therewith, the latter suitably journalled on the machine end-frame. A sprocket wheel 15 on the end of the worm shaft is chain-driven by the magazine motor (not shown except diagrammatically at 16 in Fig. 1). This may be any suitable kind of motor but I prefer a pneumatic motor connected to the suction through a pneumatic cut-off 17.

The motor for unwinding and rewinding the music-roll is preferably the usual pneumatic motor 18 indicated diagrammatically in Fig. 1 as is also the clutch mechanism for connecting it at will either to the take-up spool 19 to unwind or play the roll, or to the music-roll spool itself to rewind the roll. This mechanism, shown diagrammatically in Fig. 1, is shown in further detail in the other figures and need not be described further than to say that the drive shaft 20 (sprocket and chain driven from the music-roll motor 18, Fig. 1) has the usual clutch sleeve 21 (Fig. 3) rotatable with said shaft but slidable laterally thereon upon a spline or feather. On either side of this clutch sleeve are the usual gear sleeves 22 and 23 loose on the shaft. On the adjacent faces of all these sleeves are the usual clutch pins so that when the clutch sleeve 21 is carried to the right in Fig. 3 by moving the lever 24, the drive shaft 20 through intermediate gearing shown in Fig. 3 will be connected to drive the music-roll drive shaft 26 to rewind the roll. Vice versa, when the clutch sleeve is moved to the left in Fig. 3 into clutch with the gear sleeve on that side, it causes the take-up spool drive shaft 27 to be driven to unwind and play the roll. It will be seen that this clutch and drive mechanism is supported on its own frame, which latter in turn is supported by the base plate 4 of the machine and by the right hand end-frame 1.

The said take-up spool and music-roll drive shafts 26 and 27 extend through the said end-frame in suitable bearings. On the left side of the end-frame in Figs. 1 and 3, the shaft 27 supports the drive spindle 27$^a$ for the take-up spool, whereas the other shaft 26 supports a disc 28 having a clutch pin or projection on its face, the latter adapted by the rotation of the disc to engage and drive the similar clutch pin disc 9, earlier referred to, of one of the music-roll drive spindles 7 carried by the rotatable magazine. This it can do with the driving spindle of the particular roll of the magazine which has been carried by said magazine into the position shown by the roll 8$^x$ in Figs. 3, 4 and 8,—in other words, the lowermost roll in the magazine is the only active roll, all the others being in out-of-play position but each being capable of being brought into play like the roll 8$^x$ by the rotation of the magazine in the direction of the arrow in Fig. 8. The diagram Fig. 1 shows the said clutch discs in engagement for driving the music-roll spool to rewind the roll; and the same is also indicated in Figs. 3 and 4. Fig. 14 shows a music-roll clutch disc 9 being carried by the rotation of the magazine into engagement with the clutch disc 28 of the drive shaft. The pins on these discs in cross-section are like double edged knife blades so that they will pass each other in case they meet head on. The driving position is, of course, when the axis of the music-roll clutch discs coincides with that of the drive disc.

The spindle 29 for supporting the left end of the take-up spool in Fig. 3 is itself supported by the left end-frame of the machine. In other words, the take-up spool is supported by the stationary part of the machine and not in any way by the rotary part of the machine. Furthermore, there is only one take-up spool for all the music-rolls in the magazine. The same applies to the tracker bar 30 (Figs. 3 and 8) which is supported by the machine end-frames in a position between the take-up spool and the active music-roll 8$^x$. The tracker bar and a tracking device (not shown) for tracking the music-sheet across it may be of any usual or preferred construction.

The end discs of the magazine are formed at their periphery with shallow radial slots 31 to receive the ends of metal rods 32 extending parallel to the music-rolls, one for each roll. Each rod (Figs. 4, 6 and 7) at its center is provided with a hook 33 to which the ring 34 or eyelet of the adjacent music-roll can be attached. This is done after each roll has been placed between the spindles which support it in the magazine. The rods 32 are held from dropping out of the slots during rotation of the magazine by leaf springs 35 (Fig. 8) supported on the inner faces of the magazine end discs.

Looking now again at Fig. 8, it will be seen that the rod 32 for the roll 8$^x$ (which, it will be remembered, is the playing position into which the magazine brings each roll), is at the upper end of a curved slot located between a pair of suitably supported stationary guide members 36 of which there is a duplicate pair on the opposite side of the machine. The means soon to be described which connects the music-roll to the take-up spool engages and carries the rod 32 down between these guides to the take-up spool. Flanges 19$^a$ of this spool are notched, as shown in Fig. 8, as is also its barrel, so that when said notches are presented to the rod, it enters them, and by the continued rotation of the spool in clockwise direction in Figs. 8 and 9 is carried down into the notch or groove in the barrel, after which the music-sheet wraps around the take-up spool and is drawn thereby across the tracker bar as shown in Fig. 9 to unwind and play the roll.

The referred to sheet-connector means consists of two arms 37 (Figs. 3, 4, 8, etc.) secured to a horizontal rock shaft 38, said arms being parallel to each other and being swung by the rock shaft in vertical planes adjacent the outer sides of the magazine-ends. The upper ends of these arms have downwardly open sockets (Figs. 3 and 8) which are in the path of and receive the projecting ends of the rod 32 when the arms are swung downwardly, so that the rod, carrying with it the attached music-sheet, is carried out of the peripheral recesses in the magazine down between the guides 36 into the notch in the take-up spool flanges and by the rotation of said spool into engagement with the groove in its barrel so that the sheet wraps about said barrel and is drawn across the tracker board to play the music-roll.

To operate said arms 37, a pneumatic 39 has a projecting piece 40 secured lengthwise of its movable board, which piece is connected by a link 41 to one of the arms. Said pneumatic by its collapse pulls the arms down. In order to return them to their normal raised position, the tension spring 42 connects the movable board with the upper end of a vertical standard 43. Near the end of its downward motion, other projecting parts from the movable board of said pneumatic 39 depress the rear ends of two valves 45 and 46 pivotally supported at their middle and raises their front ends from tubular ports 47 and 48, said valves being spring actuated so as normally to close said ports. Fig. 8 shows only one of these valved ports, the other being directly behind that shown. Both, however, are shown in plan in the diagrammatic view Fig. 1. The pneumatic means for collapsing the aforesaid sheet-connector pneumatic 39 and the pneumatic means controlled by the aforesaid valved ports 47 and 48, and their respective functions, will be explained later.

Finally, at the end of its downward motion, the part 40 of the movable board depresses the pneumatic valve 49 (Figs. 1 and 8); the connections and functions of which will also be explained later on.

50 designates two stationary inclined guides supported adjacent the sides of the magazine. These are best shown in Figs. 3 and 4 and they serve to bear against the extremities of each rod 32 as it is carried by the magazine into position at the upper end of the slot between the guides 36 in Fig. 8. They thereby center said rod laterally so that both its ends will be located in the path of the sockets of the arms 37 for the puropse heretofore described.

51 is a valve (Figs. 8 and 9) pivoted to one of the guide parts on the left side of the magazine so as to co-operate with a port 52. When the valve is in its open position (Fig. 8) it is in the path of the downward motion of the rod 32 in the guide slot and is closed thereby into the position (Fig. 9) assisted by the action of the leaf spring 53 pressing against the nose of the valve. When in this closed position (Fig. 9) it will be seen that the ear-piece 54 of the valve is in the upward path of the rod 32 so that in the rewind of the music-roll, as the rod leaves the take-up spool and is carried up the guide slot, it strikes against said ear-piece and restores the valve to its open position shown in Fig. 8 assisted by the pressure of the leaf spring 53 on the nose of the valve. This ear-piece 54 is pivoted to the body of the valve so that it can be pivoted downwardly against the tension of a spring but not upwardly, so that when engaged as aforesaid by the rod 32 in its upward movement, the ear-piece is unyielding and, therefore, acts to pivot the valve into its open position as described.

Similar to the foregoing is another valve 55 (Fig. 13) pivotally supported by one of the guide parts on the right side of the magazine so as to co-operate with the port 56. This valve also has a pivoted spring-pressed ear-piece 57 like that on the other valve. In fact, the difference between valve 51 and this valve 55 is that in the latter its leaf spring 58 is positioned so as to bear always on the same side of the nose of the valve, thereby always closing it on its port after it has been momentarily opened by the upward movement of the rod 32 on the rewind. The respective pneumatic means controlled by these valved ports 52 and 56 and their respective functions will be described in due course.

The means for stopping the rotation of the magazine so that one or the other of the rolls is presented in the position of the roll 8× (Fig. 8) with its rod 32 ready for the arms 37 to carry it down to the take-up spool, comprises:—An elbow lever 59 (Figs. 5 and 4) pivoted to the right end-frame of the machine, said lever being biased by the spring 60 so that its vertical arm tends towards the periphery of the adjacent end disc of the magazine. A round-sectioned pin 61 projects from the side of the arm. When the aforesaid spring is allowed to act unimpeded, it carries this pin 61 of the arm into contact with the periphery of the adjacent end disc of the magazine and stops further rotation of the magazine by seating itself in the first deep notch 62 that it rides into, said deep notches being led up to by the shallow depressions 63. To unlock the magazine for further rotation, the horizontal arm of the elbow lever is connected by the link 64 with the movable board of the pneumatic 65, said pneumatic when on atmosphere, as distinguished from suction, being expanded by the tension spring 66 connecting its movable board to the standard 67.

68 is a horizontal stationary arm secured to the machine frame serving to support a tubular port 69 and a tilting valve 70 therefor, spring-positioned to normally close said port. When the elbow lever 59 is in magazine locking position, its horizontal arm engages and opens said valve 70. When the pneumatic collapses to unlock the magazine, the pulled down horizontal arm of the lever permits said valve to close its port. The mechanical connection between said horizontal arm and the link 64 preferably permits lost motion by the link, said link consisting of a rod having a screw-threaded upper end (Fig. 5) fitted with a nut, said rod being vertically slidable through a collar or band on the side of said horizontal arm. The pneumatic connections of the pneumatic 65 and of the port 69 and the function of the latter will be described later.

Means is provided for automatically playing each roll as it arrives at its playing position 8ˣ (Fig. 8) at the proper tempo called for by said roll. This means comprises slides 71 (Figs. 4 and 8), as many as there are places for rolls in the magazine, mounted on the magazine cross-bars 5 which, it will be noted from Fig. 8, are located radially in line with the music-rolls. The said slides 71 (Figs. 3ᵃ and 4) have longitudinal slots through which pass the shanks of set screws 72 into the cross-bars 5 of the magazine to permit the slides to be fastened thereto in various positions of endwise adjustment. At the left in Fig. 4, the ends of said slides project freely through slots in the magazine end disc 1 in order to bear against and rock the tempo controlling lever 73 about its fulcrum 74 (Fig. 4), this being brought about as shown in Fig. 8 by the rotation of the magazine just before the music-roll reaches its playing position 8ˣ. The aforesaid slides are provided with graduations (compare Fig. 3ᵃ) calibrated to correspond to the tempo of the rolls, and their adjustment is made relatively to fixed pointers 75 supported by the bars 5.

It will be understood that the user of the magazine will appropriately adjust these slides by hand at the time he puts the music-rolls into the magazine, the result being that said slides will project to the correct extents to the left in Fig. 4 to move the tempo lever 73 to the correct adjustment to play each roll at its proper tempo.

The foregoing tempo control lever really consists of two arms 73 as best shown in front elevation in Figs. 3, 4 and 8, secured respectively at the upper and lower ends of the vertical rock shaft 74. The lower of these arms is connected by the link 76 running across the lower front of the machine to the short lever arm 77 of the horizontal rock shaft 78 (Fig. 4) having a lever arm 79 at its rear end operatively connected with the stem 80 of a valve (not shown) in the tempo control box 81 of any usual and well known construction for adjusting the speed of travel of the music-sheet to any desired tempo. The tension spring 82 connects the said lever arm 77 with the base board and biases the described lever and rock shaft connections so that the tempo control lever 37 at the left in Figs. 3 and 4 always bears yieldingly in the direction of the left end 1 of the magazine or against the extremities of the tempo graduated slides 71.

The double pneumatic 83 (Fig. 1) is operatively connected by the slidable rod 84 with the heretofore described clutch lever 70 24 by a link (Fig. 1) to shift the clutch sleeve 21 to connect the music-roll motor 18 (Fig 1) to drive either the take-up spool or the music-roll.

Fig. 2 is a diagrammatic view of the control tablet 85 and its parts and of the electrical connections to the so-called distributor for automatically stopping the magazine at any music-roll selected at the tablet in operative position to play that roll. The tablet itself is indicated in Fig. 2 by the dotted rectangle.

On it is depicted the numerals 1 to 10 in a vertical row. Adjacent these at the left are ten miniature electric light bulbs indicated by small circles 86; and adjacent the same numerals to the right are the switches hereinafter called selection switches 87 because closing any one or more of them causes the machine to select and play the corresponding rolls of the magazine. The numerals 1 to 10 refer to the places for music-rolls in the magazine. Below all the foregoing on the tablet are switches marked thereon "Continuous", "Re-roll", "Repeat", and "Start", these names being descriptive of their functions for the guidance of the user or operator.

The "Start" switch is a two point hand switch connecting the electric light mains to the electric motor 88 (bottom of Fig. 2) for driving the exhauster 89 which supplies the suction for operating all of the pneumatic apparatus of the machine. At the top of Fig. 2 is a two point pneumatically operated electric switch in circuit with the aforesaid "Start" hand-operated switch. This pneumatic switch has a tilting switch arm 90 fulcrummed to a post 91 connected to one pole of the circuit, said arm being tiltable to the right or to the left to contact with one or the other of the two points 92, these latter being respectively electrically connected to the two points of the "Start" switch. The underside of the tilting arm is formed, as shown, with a centrally located downwardly directed point. The pneumatic 93 has a switch arm operating member 94 held yieldingly upright by the adjacent springs 95 on the movable board of said pneumatic, to which board it is pivoted. The pneumatic is collapsed by suction and expanded by a spring (not shown) when the pneumatic is connected with atmosphere. In other words, the pneumatic 93, its attached switch arm operating member 94, and the tilting switch arm 90 are of a construction whereby each time the pneumatic is allowed to expand after it has been collapsed causes the member 94 to engage the other side of the pointed part on the tilting switch arm from that which it previously engaged and, therefore, tilts said arm to break the electrical circuit at one of the points 92 and to make circuit at the other.

It will be seen from the described connections that when the operator throws the "Start" switch (Fig. 1) to one of its two points corresponding to the point 92 of the pneumatic switch engaged by its tilting arm 90, that the electric motor driven exhauster 89 will be put into operation for the supply of suction to the entire machine.

Two spaced apart stationary spring contacts 96 receive between them the contact 97 on the movable board of the pneumatic when the latter has been collapsed. The said contacts 96 are electrically connected to the points 92, the result being that when the pneumatic is collapsed and is held collapsed, the current cannot be interrupted to stop the exhauster and the entire machine by any one inadvertently opening the "Start" switch or operating it over to its other point. In other words, the machine continues to operate as it should until such time as the pneumatic 93 of the pneumatic switch is automatically expanded during the sequence of operations of the machine, whereupon the tilting switch arm 90 will be automatically shifted from its active contact point 92 to interrupt the current to the exhauster and stop the machine. The pneumatic connections of the switch pneumatic will be described later.

I will now describe the so-called distributor for stopping the rotation of the magazine and playing the roll or rolls corresponding to the heretofore referred to selection switch or switches 87 which the operator has chosen to close. This distributor consists of a circular row of stationary electrical contacts 98 and 99 over which plays or sweeps a wiper contact 100 (Fig. 2). In the actual machine the wiper contact is shown at 100 in side elevation in Fig. 3 fixed on the shaft of the magazine to rotate therewith; and is mounted on a piece of insulating material 101 secured to an arm 102.

The circular row of contacts 98 and 99 consists of metal points supported in a block of insulating material 103 (Figs. 3 and 10) supported stationarily by the machine frame so that the outer end of the wiper contact sweeps over the circular row of contacts, and so that its inner end bears continuously on a central contact 104 in the said stationary block 103, all as indicated diagrammatically in Fig. 2. The said center contact is connected to one pole of the battery 105 (Fig. 2). The circular row of contacts are segregated into ten pairs corresponding to the number of places for rolls in the magazine. Each pair consists of a contact 98 (Fig. 2) and of a contact 99, the one being electrically connected to one of the selection switches 87 and the other to the adjacent miniature electric bulb 86. The other terminals of said switches and bulbs are electrically connected to the other pole of said battery 105. In the diagram (Fig. 2) only selection switch 1 corresponding to the magazine roll $8^x$ is shown closed. Assuming the magazine to be in rotation, same will continue until the wiper contact 100, carried by said magazine, reaches the position shown, which is the playing postion $8^x$, already referred to, of the roll, whereupon said wiper contact will close the battery circuit through both the selection switch No. 1 and the adjacent bulb and will also energize the so-called "play" magnet shown at the top of Fig. 2 to attract its armature and open the pneumatic port 106 (Figs. 1 and 2), the effect of which, as will later appear, is to interrupt the rotation of the magazine and lock it in operative position to play the selected roll.

At the top of Fig. 2 is a safety switch 107 which is pneumatically operated in the battery circuit, said switch being kept continuously on suction supplied from the exhauster 89, but as soon as the latter stops,—for example, automatically in the sequence of the operation of the machine,—then said switch pneumatic springs open and thereby automatically interrupts all the circuits of the battery 105.

The hand switches (bottom of Fig. 2) marked "Continuous", "Re-roll", "Repeat", respectively control battery circuits through electro-magnetic valves of the same designations shown at the top of said Fig. 2; and the further connections and the function of each of these will be described later.

Figs. 15 to 22 show diagrammatically the operations in sequence of the machine and also serve to show additional parts of the machine and pneumatic and other parts and connections not yet described important to its operation. The description of these disclosures of said Figs. 15 to 22 will also serve as a description of the mode of operation of the machine. "To suction" in these figures means that all of said parts so designated are connected to the exhauster 89.

Merely lines have been used to indicate the tubing which connects the pneumatic parts. Wherever these lines are shown dotted, it means that the apparatus to which they lead has been included for cross reference purposes, but is not the prime subject of that figure or of the description relating thereto.

(Fig. 15)—The new parts in Fig. 15 are as follows: 108 is a pair of pneumatic valves, one an inside, the other an outside valve. These valves are operated from the tracker duct 109 to throw suction and atmosphere respectively on the double pneumatics 110 so that they act to shift the D-valve 111 to the right in this Fig. 15 as soon as the aforesaid exhauster 89 is started which, it will be remembered, takes place as soon as the "Start" switch (Fig. 2) is operated to start the electric motor 88. Said D-valve 111 now connects the ports 112 and 113. 114 is a pneumatic valve which because it is down connects the suction via said valve to the magazine lock pneumatic 65, thereby collapsing it and unlocking lever 59 from the magazine. Up to this moment said lever 59 has been in its locking position and has been holding the valved port 69 open, but now said port 69 will be closed as shown. This admits suction to lower the valve 115, thereby admitting suction into the pouch of the cut-off valve 17 which thereupon drops and connects the suction to the magazine drive motor 16 and starts the magazine.

To sum up, Fig. 15 shows that starting the exhauster from the "Start" switch (Fig. 2) has two immediate effects,—first, to unlock and free the magazine for rotation, and secondly, to start the magazine motor to rotate the magazine.

(Fig. 16)—This figure shows the same parts as in the just described Fig. 15 but in different adjustments due to the play magnet being shown energized in Fig. 16 to attract its armature to open its port 106 to atmosphere. This takes place by the operator closing any one or more of the selection switches 87 (Fig. 2),—for example, the No. 1 switch on the tablet 85. Thus, referring still to said Fig. 2, and bearing in mind that the magazine is now rotating, said rotation will continue until the wiper contact 100 reaches the stationary contacts 98 and 99 corresponding to the said closed selection switch and bulb, whereupon said bulb will light and the aforesaid play magnet will open its port 106, which in turn will lock the magazine with the music-roll corresponding to the closed selection switch positioned like the roll $8^x$ (Fig. 8) operatively for playing relatively to the tracker bar and take-up spool; and will also stop further operation of the magazine motor. Thus, atmosphere entering the play magnet port 106 will raise the pneumatic valve 114 which will releasably lock itself in that position. Said valve will admit atmosphere continuously via the D-valve to the magazine lock pneumatic 65, thereby expanding it to release the locking lever so that its pin 61 enters first the proper shallow recess 63 and then the locking recess 62 to stop the magazine with the roll that corresponds to the closed selector switch in the operative playing position $8^x$. Meanwhile, the horizontal arm of said lock lever 59 has opened the valved port 69 so that the admitted atmosphere raises valve 115 admitting atmosphere to the pouch of the cut-off valve 17 which then lifts and cuts off the suction from and stops the magazine motor.

(Fig. 17)—The selected roll has now been automatically progressed and stopped by the magazine in the operative roll-playing position $8^x$. The next operation is the automatic connecting of the music-sheet tab to the take-up spool, the starting of the music-roll motor and the clutching of said motor to drive the take-up spool to unwind and play the roll. This is shown in this Fig. 17. These effects follow as further results from the opening of the port 69 by the locking of the magazine shown above in Fig. 16 and the raising of the valve 115. This latter valve 115 is connected with another valve, an inside valve 116 (Fig. 17) which, raised by the atmosphere received under its pouch from 115, acts to connect suction to collapse pneumatic 117. This latter pneumatic carries a tilting arm 118 which by its downward motion due to the collapse of the pneumatic only momentarily (this being the purpose of the pneumatic 117) opens the valve 119 of the port 120, which in turn admits atmosphere to the pouch of the self-locking valve 49 and raises said valve 49 which in turn raises the valve 121 and connects suction to the heretofore described sheet-connector pneumatic 39, which thereupon collapses and pulls down the arms 37 (Fig. 8) and with them the rod 32 and the attached sheet of the music-roll across the tracker bar and towards the take-up spool.

While this is happening, the described collapse of said sheet-connector 39 has brought its arms (Fig. 1) into contact with the valves of the ports 45 and 46, thereby opening said ports to atmosphere. The opening of these ports starts the music-roll motor and clutches it in to drive the take-up spool as follows:— Thus, atmosphere momentarily entering port 45 raises the pouch and valve of the self-locking valve 122 which in turn admits atmosphere to raise the inside valve 123 which in turn admits suction to depress the valve in the cut-off 244 which thereupon connects the suction with and starts the music-roll motor 18 (Fig. 1).

Returning now to the other port 46, the atmosphere momentarily entering said port 46 raises the pouch and valve of valve 124 which in turn connects the suction with one of the double pneumatics 83 (Fig. 1) to collapse same to the left to operate the clutch sleeve 21 (Fig. 1) to connect the music-roll motor 18 to drive the take-up spool 19. Meanwhile, it will be remembered that the sheet-connector pneumatic 39 is in the act of carrying the rod 32 and the connected sheet down to the take-up spool and, therefore, as soon as the open notch in the flanges of said spool are presented to said rod, it enters said notch and is carried by the rotation of the spool down into the groove in the barrel of the spool heretofore described in connection with said Figs. 8 and 9, and the music-sheet then wraps about the spool and is played as it is drawn down over the tracker bar. The machine left to itself then plays this roll to the end, whereupon the usual re-roll perforation in the sheet effects the automatic re-roll thereof, or the re-roll can be effected sooner by manually closing the re-roll switch (Fig. 2), as will be later described.

The connections and functions of the heretofore described valve 51 (Figs. 8 and 9) and its port 52 are also shown in this same Fig. 17 and are as follows: Before the collapsing sheet-connector pneumatic 39 opens the aforesaid ports 45 and 46 to start the take-up spool into rotation, the rod 32, to which the music-sheet is connected, strikes against and closes the valve 51 against its port 52 (the normal position of this valve is up with its port 52 open due to the re-roll of a previously played roll, as will appear later from Fig. 19, said port 52 when open acting to stop the music-roll motor). The closing of the port 52 has two effects, first, it prepares for the starting of the music-roll motor by the subsequent opening of the port 45, already described in connection with this same Fig. 17, and also it collapses the switch pneumatic 93 heretofore described in connection with Fig. 2, so that the power current to the exhauster 89 passes through the contacts 96 and 97 and cannot be interrupted by the operator thoughtlessly operating the "Start" switch (Fig. 1) as previously explained, and stopping the exhauster, because if the operator should do this at this critical time it would result in stopping the machine with the rod 32 and the front end of the sheet in a half way position somewhere between the magazine and the take-up spool and a subsequent attempt to start the machine might lead to upsetting the sequence of operations and possible damage to the music-sheet and to the machine.

The explanation of how the closing of the said port 52 by the downward motion of the rod 32 produces these two effects is as follows: The port 52 being closed, the theretofore raised valve 125 drops, connecting the atmosphere to the theretofore collapsed pneumatic 126 so that said pneumatic expands due to a spring (not shown), and its movable board no longer prevents the valve 122 from raising. This it does as soon as port 45 is opened by the additional collapse of the sheet-connector pneumatic 39 and results in starting the music-roll motor 18, as already explained in connection with this same Fig. 17.

The second effect of closing the said port 52 in this same Fig. 17 is to lower the theretofore raised valve 127 and thereby connect the switch pneumatic 93 (compare Fig. 2) to suction, thereby collapsing the pneumatic and closing the contacts 96 and 97 of the exhauster circuit for the above explained purpose.

In short, the following has been accomplished thus far in Fig. 17: The connecting of the music-sheet to the take-up spool; the starting of the music-roll motor; the clutching of said motor to the take-up spool to play the music-sheet; also the valved port 52 theretofore opened to stop the music-roll motor has now been shut to permit said motor to be started; also the closing of said port 52 has closed the switch pneumatic 93.

Finally, the sheet-connector pneumatic 39 at the end of its collapse causes its arm 39$^a$ to depress the self-locking previously raised valve 49, whereupon suction is now connected to the pouch of valve 121 dropping said valve and putting the sheet-connector pneumatic 39 on atmosphere so that its spring 42 (Fig. 8) then lifts the sheet-connector arms 37 to their initial position ready for operation in connection with another music-roll.

(Fig. 18)—The roll corresponding to the selection switch No. 1 continues to play until its re-roll perforation is reached which when it registers with the re-roll tracker duct 128 (Fig 1) causes the roll automatically to re-roll from the take-up spool back onto the music-roll spool. If the operator desires to effect the re-roll sooner, this can be done by closing the re-roll switch (bottom of Fig. 2). Since the re-roll tracker duct is open while the operations take place in the preceding figures and until the front end of the music-sheet has been drawn fully across the tracker bar and connected to the take-up spool, and since the said exposure of the re-roll duct 128 would effect premature and unintended re-rolling I provide means for preventing this whose operation is also shown in Fig. 18.

To proceed:—The re-roll duct 128 is operatively connected to the left of the clutch-shifting pneumatics 83 through the re-roll cut-off 129 and thence through the pneumatic valve 130. The pouch chamber of said cut-off is connected to the pneumatic valve 131 whose pouch chamber is in turn connected to a duct 132 extending from the periphery of the take-up spool through the axis of the left hand trunnion of said spool. Thus, this take-up spool duct 132 is exposed until the front end of the music-sheet has been connected to it and wrapped about its barrel at least once or twice. Up to that time said duct 132 by admitting atmosphere into pouch chamber of valve 131 raises said valve, admitting atmosphere into the pouch chamber of the cut-off 129 and thereby cuts off all connection between the re-roll tracker duct 128 and the re-roll mechanism, namely, renders said mechanism inoperative. However, operativeness is restored to the duct 128 as soon as the sheet has been connected with the take-up spool as in previous Fig. 17 and covers its duct 132, because then valve 131 will be down, connecting suction to the pouch chamber of the cut-off 129, thereby unobstructedly connecting the re-roll tracker duct 128 to the valve 130 and the clutch operated pneumatic 83. Nothing happens, however, until the usual re-roll perforation at the end of the music-roll exposes to atmosphere the tracker duct 128 or until the re-roll switch (Fig. 2) is manually closed to energize the re-roll magnet (top of Fig. 2) to open to atmosphere port 133 (Figs. 2, 18 and 1). In either case, atmosphere is admitted via the re-roll cut-off 129 into the pouch chamber of the valve 130, raising said valve and connecting suction to the left of the clutch-operating pneumatics 83 to operate the clutch lever 84 and the clutch sleeve to the right to clutch the music-roll motor 18 (Fig. 1) to the music-roll drive shaft 26 to drive and rewind the music-roll.

(Fig. 19)—This figure shows how the rod 32 as it leaves the take-up spool at the end of the re-roll operation opens the heretofore described valve 51 of the port 52 and first stops the music-roll motor and secondly operates the switch pneumatic 93 to break the main power circuit to stop the exhauster 89 and all further operation of the machine unless the operator has previously closed the "Continuous" switch (Fig. 2), in which event the exhauster is continued in operation as will be explained later in Fig. 21.

The parts in Fig. 19 are also shown in the previous Fig. 17 but with different adjustments brought about by the rod 32 of the music-roll, as just explained, having opened the port 52 at the end of the rewinding operation. Up to that time, it will be remembered from Fig. 17, the valve 122 has remained locked in its up position and has kept the music-roll motor in operation to play the roll. The opening of the port 52 as in Fig. 19 now unlocks this valve 122 by operating valve 125 to throw suction on the pneumatic 126 to collapse it and depress said valve 122. This in turn reverses the pneumatic action of the valves 122 and 123 in the music-roll motor cut-off 224 from that shown in Fig. 17 so that now (Fig. 19) it cuts off and stops said motor.

Opening the port 52 also raises the valve 127 and puts the switch pneumatic 93 on atmosphere whereas theretofore it has been collapsed. This expands the switch pneumatic and in doing so it reverses its tilting switch arm 90 (Fig. 2) thereby breaking the power circuit to the exhauster and stopping the entire machine, including opening the pneumatic switch 107 (top of Fig. 2) controlling the tablet circuits of the battery 105.

The foregoing is as it should be since the single roll corresponding to the single selection switch No. 1 has now been played and re-rolled, and that was all the machine was set to do upon the assumption with which we started.

(Fig. 20)—As the rod 32 leaves the take-up spool at the end of the re-roll in Fig. 19, it also momentarily opens the heretofore described valve 55 from its port 56 (Fig. 13). This acts first to unlock the theretofore locked magazine, and secondly it starts the magazine motor 16 (Fig. 1). The parts in this Fig. 20 are similar to those in Figs. 15 and 16 but in different adjustments due to the momentary opening of said port 56. This raises valve 134 and connects suction to collapse the pneumatic 135 which depresses the valve 114 which has theretofore remained locked in its up position as in Fig. 16 to keep the magazine locking pneumatic 65 expanded and the magazine locked against rotation. The now depressed valve 114 (Fig. 20) connects the suction to said magazine locking pneumatic 65, collapses it and unlocks the magazine for rotation. At the same time the theretofore open port 69 in Fig. 16 now closes as in Fig. 20 and drops the valve 115, connects suction to the cut-off 17 and starts the magazine motor 16 to rotate the magazine. However, this is stopped by the raising of the valve 51 from its port 52 because this stops the exhauster 93 as explained in Fig. 19, unless the operator has previously closed the "Continuous" switch (Fig. 2), in which event the magazine continues to rotate as will now be shown in connection with the next Fig. 21.

(Fig. 21)—When the "Continuous" switch (bottom of Fig. 2) is closed, it energizes the continuous magnet (top of Fig. 2) from the battery 105 to attract its armature to open its port 136, thereby admitting atmosphere to the pouch chamber of the valve 137, raising said valve and connecting suction to the top of the valve 127 via the conduit 138. Since the valve 127 is up due to the valve 51 being still open (Fig. 19), this suction is delivered by it in Fig. 21 to the switch pneumatic 93 keeping it collapsed instead of permitting it to expand on atmosphere which it did in said Fig. 19 due to the fact that the "Continuous" switch was not closed and the continuous magnet port 136 (Fig. 19) was not opened and the valve 137 was down and, therefore, admitted atmosphere to expand the switch pneumatic 93 to stop the exhauster and the entire machine. It follows that when the "Continuous" switch is closed, the momentary opening of valve 55 from its port 56 in Fig. 20 to start the magazine motor results in continuing said motor in operation and the magazine in rotation. If either now or at the beginning (at the time selection switch No. 1 was closed), some or all of the other selection switches be closed, the magazine will rotate until it presents the music-roll corresponding to the next closed selection switch in the playing position 8$^x$, whereupon the magazine will be automatically stopped and locked (as explained in Fig. 16) and its music-sheet will be attached to the take-up spool (as in Fig. 17) and then automatically re-rolled (as in Fig. 18); then the magazine will be unlocked and the magazine again started to rotate as in Fig. 20 until the roll corresponding to the next closed selection switch is presented in the playing position 8ˣ, whereupon the same cycle of operations will be repeated until the "Continuous" switch is opened which will automatically stop the machine due to the operation of the switch pneumatic 93, (as explained in Fig. 19) after the rewinding of the last roll played.

(Fig. 22)—To repeat the playing of any roll, the "Repeat" switch (bottom of Fig. 2) is closed which operates the repeat magnet (top of Fig. 2) to open its port 139, admitting atmosphere to the pouch chamber of valve 140, raising said valve and connecting suction to cut-off 141, to open connection through it from the heretofore described take-up spool port 132 (Fig. 18) through said cut-off to the pouch of the valve 124, raising said valve to connect suction to the right hand clutch pneumatic 83 to operate the music-roll motor clutch to wind the music-sheet back again on to the take-up spool. All this takes place due to the momentary exposure of the take-up spool duct 132 at the end of the automatic re-roll and before the music-sheet disconnects from said spool.

As long as the "Repeat" switch is open, no automatic repeat takes place because the port 139 (Fig. 22) being closed, valve 140 is down and atmosphere is on the cut-off pouch which cuts off connection from the take-up spool duct 132 and renders it operative to repeat the roll.

When the exhauster stops, the double pneumatic 110 (Fig. 15) centralizes itself due to the action of springs (not shown) and moves the D-valve 111 to the left, exposing port 113 to atmosphere, and expanding the magazine pneumatic 17 to lock the magazine and stop the magazine motor.

Thus, Figs. 15 to 22 show the sequence of operations of the machine. In doing so they necessarily repeat each other as to some of the devices. Also, the devices in these figures are shown schematically in Figs. 1 and 2. In the actual machine, the valves designated 127, 138, 137, 124, 140, 123, 116, 131, 125, 130, 134, 150, 121, 151 and 115 are for convenience combined in a single valve chest shown at the top of Fig. 1.

Regarding the tilting arm 118, a spring (not shown) keeps said arm yieldingly in the position shown in Fig. 17 with its foot against the movable board of the pneumatic. After the momentary collapse of said pneumatic described in connection with Fig. 17, said tilting arm upon the expansion of the pneumatic strikes the underside of the valve 119 and the yielding tiltable suspension of said arm 118 permits it to pass to the position shown in Fig. 17 before the valve 119 for subsequent operation thereof.

Springs (not shown) normally expand both of the pneumatics 110 equally when the suction is off; also under like circumstances, springs (not shown) are provided to expand such pneumatics as 135, 126 and 93.

The heretofore described lever 59 for automatically locking the magazine is provided with a handle 59ᵃ (Figs. 5 and 12) by which the magazine can be manually unlocked to permit the magazine to be rotated manually to enable the user to remove and insert the music-rolls.

If for any reason the user happens to stop the machine with one of the music-rolls connected to the take-up spool, and later wishes to rewind that roll to clear the machine, all he has to do is to close the start and re-roll switches (Fig. 2). This will energize the re-roll magnet to open the valved port 133 (Fig. 17) which acts exactly like the opening of the port 45 (Fig. 17) heretofore described to operate the motor cut-off 224 to start the music-roll motor and thereby accomplish the desired purpose.

At the lower right hand corner of Fig. 1 are two valved ports 152 and 153 normally closed but positioned to be opened by the clutch rod 84 whenever it is moved to the right to rewind the roll. By following out the connections shown in Fig. 1 and other figures, it will be seen that these said ports 152 and 153 serve to speed up the music-roll motor on the rewind and to cut off the suction from the tracker bar ducts and the like so that the instrument will be silent during said rewind. These, of course, are well known features and are not claimed herein.

While the mechanisms herein shown and described constitute preferred forms of embodiment of my invention, it is to be understood that other forms might be adopted and some parts might be used without others, all coming within the scope and spirit of the claims which follow.

What I claim is:

1. In combination, a magazine for operatively supporting a plurality of music-rolls; a tracker bar; a take-up spool; drive means for said magazine; a pneumatically operated magazine-lock; a ported valve operated by said magazine-lock and operatively connected with said drive means, said lock when in locked and unlocked positions respectively operating said valved port to stop and to start the magazine drive; and selective means for operating said lock to stop the magazine with any selected roll in operative position relatively to the tracker bar; said means comprising a valved port operatively connected to the magazine-lock pneumatic.

2. In combination, a magazine for operatively supporting a plurality of music-rolls; a tracker bar; a take-up spool; drive means for said magazine; a pneumatically operated magazine-lock; a ported valve operated by said magazine-lock and operatively connected with said drive means, said lock when in locked and unlocked positions respectively operating said valved port to stop and to start the magazine drive; and selective means for operating said lock to stop the magazine with any selected roll in operative position relatively to the tracker bar,—said means including a valved port and a self-locking pneumatic valve operatively connecting said port to the magazine-lock pneumatic; and pneumatic means for unlocking said valve comprising a valved port arranged to be momentarily opened by the music-roll at the end of the rewind, said self-locking valve when unlocked acting to unlock the magazine and to start the magazine drive.

3. In combination, a music-roll having a front end provided with an eye; a rod having a hook at its center engageable with said eye; and a take-up spool engageable with said rod to unwind the music-roll and disengageable therefrom on the rewind.

4. In combination, a music-roll; a rod having means at its center for temporary connection with the front end of the music-sheet of said roll; and a take-up spool engageable with said rod to unwind the music-roll and disengageable therefrom on the rewind.

5. In combination, a music-roll; a rod non-integral therewith; means for temporarily attaching the front end of the music-sheet of said roll to said rod; and a take-up spool engageable with said rod to unwind the music-roll and disengageable therefrom on the rewind.

6. In combination, a tracker bar; a take-up spool; means for operatively supporting a music-roll relatively thereto; a rod releasably supported parallel and adjacent to said music-roll; means for temporarily attaching the front end of the music-sheet of said roll to said rod; and means arranged to engage said rod to carry it and the music-sheet across the tracker bar into engagement with the take-up spool.

7. In combination, a magazine for operatively supporting a plurality of music-rolls; a tracker bar; a take-up spool; drive means for said magazine; a pneumatically operated magazine-lock; a ported valve operated by said magazine-lock and operatively connected with said drive means, said lock when in locked and unlocked positions respectively operating said valved port to stop and to start the magazine drive; and selective means for operating said lock to stop the magazine with any selected roll in operative position relatively to the tracker bar; and a pneumatically operated sheet-connector controlled by said valved port and arranged to carry the front end of the music-sheet across the tracker bar into engagement with the take-up spool.

8. In combination, a magazine for containing a plurality of music-rolls; a tracker bar; a take-up spool; drive means for said magazine; a magazine lock; a valved port arranged to be operated by said lock to control said magazine drive; a sheet-connector for connecting the music-sheet of one of the rolls to the take-up spool, said sheet-connector being operated by a pneumatic operatively connected with and controlled by said valved port.

9. In combination, a magazine for containing a plurality of music-rolls; a tracker bar; a take-up spool; drive means for said magazine; a magazine lock; a valved port arranged to be operated by said lock to control said magazine drive; a sheet-connector for connecting the music-sheet of one of the rolls to the take-up spool, said sheet-connector being operated by a pneumatic operatively connected with and controlled by said valved port, the said operative connection between said valved port and said sheet-connector pneumatic comprising a pneumatic which in turn operates a valved port, which latter port is operatively connected through a self-locking valve to the aforesaid sheet-connector pneumatic, said pneumatic itself acting to unlock said self-locking valve after said pneumatic has carried the music-sheet to the take-up spool.

10. In combination, a magazine for containing a plurality of music-rolls; a tracker bar; a take-up spool; drive means for said magazine; a magazine lock; a valved port arranged to be operated by said lock to control said magazine drive; a sheet-connector for connecting the music-sheet of one of the rolls to the take-up spool; said sheet-connector being operated by a pneumatic operatively connected with and controlled by said valved port; music-sheet driving means; and means controlled by said sheet-connector arranged to render operative said sheet driving means after the sheet has been carried to the take-up spool.

11. In combination, a magazine for operatively supporting a plurality of music-rolls; a tracker bar; a take-up spool; drive means for said magazine; a pneumatically operated magazine-lock; a ported valve operated by said magazine-lock and operatively connected with said drive means, said lock when in locked and unlocked positions respectively operating said valved port to stop and to start the magazine drive; selective means for operating said lock to stop the magazine with any selected roll in operative position relatively to the tracker bar; a pneumatically operated sheet-connector, said valved port having operative connection with the pneumatic of said sheet-connector to connect the music-sheet to the take-up spool, said operative connection comprising a pneumatic which by its operation in turn operates another valved port, which latter port is operatively connected through a self-locking valve to operate the sheet-connector pneumatic; said sheet-connector pneumatic itself at the end of its operation being arranged to unlock said self-locking valve and thereby cause itself to return to its original position ready for a repetition of its operation.

12. In combination, a magazine for operatively supporting a plurality of music-rolls; a tracker bar; a take-up spool; drive means for said magazine; a pneumatically operated magazine-lock; a ported valve operated by said magazine-lock and operatively connected with said drive means, said lock when in locked and unlocked positions respectively operating said valved port to stop and to start the magazine drive; selective means for operating said lock to drop the magazine with any selected roll in operative position relatively to the tracker bar; a pneumatically operated sheet-connector controlled by said valved port and arranged to carry the front end of the music-sheet across the tracker bar into engagement with the take-up spool; music-sheet driving means; and means controlled by said sheet-connector arranged to render operative said sheet driving means after the sheet has been carried to the take-up spool.

13. In combination, means for operatively supporting a music-roll; a tracker bar; a take-up spool; a motor; music-sheet drive means; a sheet-connector comprising a pneumatic for connecting the sheet of the music-roll to the take-up spool; a valved port whose valve is opened by the sheet-connector pneumatic after it has carried the sheet to the take-up spool, said port being operatively connected through a self-locking valve to start and maintain said music-sheet drive in operation as long as said valve is locked; a second valved port arranged to be closed by the music-sheet in the act of its being connected to the take-up spool, and reversely to be opened thereby at the end of the rewind; and a pneumatic with which said second valved port is operatively connected, said port when open operating said pneumatic to unlock said self-locking valve to stop the music-sheet drive, and when closed permitting the self-locking valve to be locked without interference from said pneumatic.

14. In combination, means for operatively supporting a music-roll; a tractor bar; a take-up spool; music-sheet driving means; a sheet-connector comprising a pneumatic for connecting the music-sheet of the roll to the take-up spool; means actuated by said sheet-connector after it has carried the music-sheet as aforesaid, said means being operatively connected with said music-sheet driving means, said means including a self-locking element which continues said sheet-driving means in operation after the aforesaid actuation by the sheet-connector of said means has ceased; and other means actuated by the music-sheet at the end of the rewind of said sheet operative to unlock the aforesaid element and discontinue said music-sheet drive.

15. In combination, means for operatively supporting a music-roll; a tracker bar; a take-up spool; means for operatively connecting the music-sheet to the take-up spool; a two point tilting arm switch including a pneumatic for operating it, said switch arm being tilted from one point to the other each time the pneumatic is operated in one direction but not when it is operated in the reverse direction; a two point hand switch, said two points being severally electrically connected to the two points of the aforesaid pneumatic switch and an electric motor-driven exhauster for supplying the pneumatic parts; a source of electric current; an electrical circuit which includes said electric motor driven exhauster and said hand and pneumatic switches; a valved port arranged to be operated in one way by the music-sheet in the act of connecting it to the take-up spool, and to be operated reversely by the rewind of said sheet; and a pneumatic valve operatively connecting said port and the aforesaid switch pneumatic alternately with said exhauster and with the atmosphere to operate said switch pneumatic as aforesaid.

16. In combination, means for operatively supporting a music-roll; a tracker bar; a take-up spool; means for operatively connecting the music-sheet to the take-up spool; a two point tilting arm switch including a pneumatic for operating it, said switch arm being tilted from one point to the other each time the pneumatic is operated in one direction but not when it is operated in the reverse direction; a two point hand switch, said two points being severally electrically connected to the two points of the aforesaid pneumatic switch and an electric motor driven exhauster for supplying the pneumatic parts; a source of electric current; an electrical circuit which includes said electric motor driven exhauster and said hand and pneumatic switches; a valved port arranged to be operated in one way by the music-sheet in the act of connecting it to the take-up spool, and to be operated reversely by the rewind of said sheet; and a pneumatic valve operatively connecting said port and the aforesaid switch pneumatic alternately with said exhauster and with the atmosphere to operate said switch pneumatic as aforesaid; and electrical contacts connected with the aforesaid two points of said pneumatic switch and arranged to be closed by the pneumatic of the aforesaid pneumatic switch when said pneumatic has been operated in one direction as aforesaid, and to be opened when said pneumatic has been operated in the reverse direction.

17. In combination, a tracker bar; a take-up spool; a music-roll magazine for operatively supporting music-rolls and being operative to bring any roll into playing position;

a two point tilting arm switch including a pneumatic for operating it, said switch arm being tilted from one point to the other each time the pneumatic is operated in one direction but not when it is operated in the reverse direction; a two point hand switch, said two points being severally electrically connected to the two points of the aforesaid pneumatic switch and an electric motor driven exhauster for supplying the pneumatic parts; a source of electric current; an electrical circuit which includes said electric motor driven exhauster and said hand and pneumatic switches; pneumatic means operatively connecting with said exhauster for unlocking said magazine and driving it to bring a roll into playing position, also for locking said magazine and for stopping the magazine drive, and for automatically connecting the music-sheet to the take-up spool; a valved port arranged to be operated in one way by the music-sheet in the act of connecting it to the take-up spool and to be operated reversely by the rewind of said sheet; and a pneumatic valve operatively connecting said port and the aforesaid switch pneumatic alternately with said exhauster and with the atmosphere to operate said switch pneumatic as aforesaid.

18. The combination specified in claim 17 further characterized by means for continuous playing comprising a hand-controlled port and a pneumatic valve controlled thereby operatively connected with the first named valve to reverse its normal action.

19. In combination, a music-roll magazine adapted to support music-rolls and operable to bring a music-roll into playing position; a music-roll motor for driving the music-sheet of said roll; tempo means adjustable to vary the speed of said music-sheet from a position adjacent its aforesaid playing position; graduated parts supported by the magazine at the respective rolls arranged to be set in different positions depending upon the tempo of the rolls and to engage and thereby automatically adjust the aforesaid tempo means as each roll is brought by the magazine into playing position.

20. In combination, a music-roll magazine; magazine locking means; magazine driving means; an electrically driven exhauster supported from a manual switch; a self-locking pneumatic valve connecting said exhauster to said means for unlocking and driving the magazine; selection switches corresponding to the rolls of the magazine, each selection switch being in an electrical circuit arranged to be closed when the particular roll corresponding to a given closed switch has been carried by the magazine into playing position relatively to the tracker bar; a so-called play magnet common to all of said selection switch circuits controlling a port pneumatically connected with the aforesaid self-locking valve to lock said valve in position to operate the magazine locking means into its locking position and to stop the magazine driving means; a valved port arranged to be momentarily opened by the music-sheet at the end of the rewind; a pneumatic momentarily operated by said operation of said port to unlock said valve whereby it again connects the aforesaid exhauster to the magazine locking means and operates same to unlock the magazine and restart the magazine drive.

21. In combination, a magazine for operatively supporting a plurality of music-rolls; a tracker bar; a take-up spool; drive means for said magazine; a magazine lock, said magazine lock and drive means being interrelated; selective means for operating said magazine-lock and -drive to stop the magazine with any selected roll in operative position relatively to the tracker bar; sheet-connector means, controlled by said magazine-lock and -drive means, and arranged to carry the front end of the music-sheet across the tracker bar into engagement with the take-up spool; music-sheet driving means; means actuated by said sheet-connector while it is connecting the music-sheet as aforesaid, said means being operatively connected with said music-sheet driving means and including a self-locking element which continues said sheet driving means in operation after the aforesaid actuation by the sheet-connector of said means has ceased; sheet rewinding means; and other means actuated by the music-sheet at the end of the rewind operation to unlock the aforesaid element and discontinue said music-sheet drive; other means actuated by the sheet at the end of the rewind operatively connected with said lock and drive means to unlock the magazine and start the magazine drive; switch means controlling the power to the machine, itself operatively connected with said means normally to disconnect the power from the machine when said means is operated as aforesaid on the rewind; and hand-controlled means for so-called continuous playing operatively connected with the switch means preventing its aforesaid operation from the means.

22. The combination set forth in claim 7 further characterized by means engaging the extremities of said rod adapted to center it for proper engagement by the means which carries the rod and sheet across the tracker bar.

23. In combination, a magazine for operatively supporting a plurality of music-rolls, said magazine being operable to carry each of said rolls into a roll-playing position; a series of signals corresponding to said music-rolls; and electromechanical connections between said magazine and said signals whereby said signals by their operation show which of said rolls at any particular time is in playing position.

24. In combination with a magazine lock pneumatic, a double pneumatic operated by inside and outside valves controlled from a tracker bar duct, a D-valve operated by said double pneumatic to connect and disconnect ports for controlling the admission of suction and atmosphere to operate the aforesaid magazine lock pneumatic.

Signed at New York, in the county of New York and State of New York, this third day of October, A. D. 1928.

JOSEPH HUNTER DICKINSON.